United States Patent [19]

Nishio

[11] Patent Number: 5,703,674
[45] Date of Patent: Dec. 30, 1997

[54] IMAGE FORMING DEVICE AND METHOD HAVING PLURAL IMAGE PROJECTING PATHS

[75] Inventor: Tomonori Nishio, Kanagawa, Japan

[73] Assignee: Fuji Photo Film Co., Ltd., Kanagawa, Japan

[21] Appl. No.: 394,258

[22] Filed: Feb. 24, 1995

[30] Foreign Application Priority Data

Mar. 10, 1994 [JP] Japan ................................ 6-040011

[51] Int. Cl.$^6$ .................................................. G03B 27/44
[52] U.S. Cl. .................................. 355/46; 355/66; 355/70
[58] Field of Search ............................ 355/37, 46, 66, 355/70, 41, 38

[56] References Cited

U.S. PATENT DOCUMENTS

| | | | |
|---|---|---|---|
| 4,829,371 | 5/1989 | Hiramatsu et al. | 355/38 X |
| 5,084,726 | 1/1992 | Ibuchi et al. | 355/46 X |
| 5,122,831 | 6/1992 | Suzuki | 355/37 |

FOREIGN PATENT DOCUMENTS

| | | | |
|---|---|---|---|
| 60-225836 | 11/1985 | Japan | G03B 27/46 |
| 61-137145 | 6/1986 | Japan | G03B 27/72 |
| 64530 | 1/1989 | Japan | G03B 27/73 |
| 256542 | 2/1990 | Japan | G03B 27/73 |

*Primary Examiner*—Fred L. Braun
*Attorney, Agent, or Firm*—Sughrue, Mion, Zinn, Macpeak & Seas, PLLC

[57] ABSTRACT

An image forming device and method. A first scanning device is provided under a transparent glass plate. An image of a paper original loaded on the transparent glass plate is scanned and exposed onto a photosensitive material at an exposure section by the first scanning device. A second scanning device formed from a light source unit, a scan table at which a film original is set, a zoom lens and a lens is provided next to the first scanning device. Further, a mirror, a lens and line sensor are disposed in that order below the scan table. Densities of an image of the film original are read by the line sensor for each pixel and for each color. After exposure conditions are determined based on the densities obtained by the line sensor, the image of the film original is scanned and exposed onto the photosensitive material by the second scanning device.

21 Claims, 7 Drawing Sheets

IMAGE FORMING DEVICE AND METHOD HAVING PLURAL IMAGE PROJECTING PATHS

BACKGROUND OF THE INVENTION

1. Field of the Invention

The present invention relates to an image forming device and an image forming method. In particular, the present invention relates to an image forming device which has a first scanning/exposing means for scanning/exposing, onto a photosensitive material, an image of a first original of a predetermined size, and a second scanning/exposing means for scanning/exposing, onto a photosensitive material, an image of a second original of a size which is smaller than the predetermined size, and to a method using the image forming device.

2. Description of the Related Art

Conventionally, color image forming devices in which an image of an original is recorded onto a recording material have been known. In this type of image forming device, a loading stand formed from a transparent glass plate is provided on the upper surface of the device, and a scanning/exposing section is provided under the loading stand. In the scanning/exposing section, slit light is scanned onto the surface to be copied of the original which has been loaded on the loading stand. By irradiating the light which has been reflected by or transmitted through the original onto an intermediate transfer medium which is photosensitive, e.g., a photosensitive material, a photosensitive drum or the like, or by irradiating the light directly onto a photosensitive recording material, the image of the original is scanned and exposed. In cases in which scanning/exposing onto an intermediate transfer medium is effected, the latent image recorded on the intermediate transfer medium is developed, and is transferred to an image-receiving material which serves as a recording material. In a case in which the image is scanned/exposed directly onto a photosensitive recording material, the latent image recorded on the recording material is developed so that the image is formed on the recording material.

Structures have been proposed in which, in the above image forming device, a reading means, such as a photosensor or the like, is provided as a means for exposing at an appropriate exposure amount which corresponds to the density of the image of the original. The density of a reference white plate or a test chart, or the average density of the image of the original is measured, and the appropriate amount of exposure is determined (see JP-A-64-530, JP-A-1-217335, JP-A-1-277229).

In this type of image forming device, paper is the medium which is usually used as the original. However, in recent years, there has been a need to use various types of media at the image forming device, and a need to be able to record images recorded on the various media onto a recording material. For example, there has been a need to use films such as a negative film or a reversal film as the original and to be able to record images recorded on such films onto a recording medium. As a result, image forming devices have been proposed which have a second scanning/exposing section in addition to the scanning/exposing section described above. The second scanning/exposing section scans slit light onto the film original and scans/exposes the light, which was transmitted through the film original, onto an intermediate transfer medium or a recording material at the same exposure position as described above.

The second scanning/exposing section considers a case in which the size of the image recorded on the film original is relatively small, and is structured so as to include an enlarging optical system, such as a zoom lens or the like, which is provided between the position at which the film original is disposed and the exposure position. The image of the film original is enlarged and recorded onto the recording material.

The exposing of the image recorded on the film onto the photosensitive material or the like is usually carried out in the following manner: the light accumulated transmission density (LATD) of the film image is measured in advance, and the amount of exposure is controlled in accordance with exposure conditions determined on the basis of the measured LATD. However, because there has been a demand in recent years for more appropriate exposure conditions, systems have been proposed in which the film image is divided into pixels whose respective densities are measured, and the exposure conditions are determined on the basis of the measured density data for each of the pixels (see JP-A-61-137145).

In contrast, the above-described exposure conditions determining method cannot be applied to an image forming device such as that described above and disclosed in, for example, JP-A-2-56542 in which an image of a film original is read with a relatively large region thereof used as a unit and in which the image of the film original is scanned and exposed by slit light. As a result, conventionally, the film original is set in advance at a print information processing device which is an entity separate from the image forming device (see JP-A-60-225836). The image of the film original is read optically by the print information processing device, and correction information for the exposure conditions is determined. Thereafter, the film original is set at the image forming device, the exposure conditions are corrected in accordance with the determined correction information, and image forming is carried out. Accordingly, the work involved in this method is complicated.

Alternatively, systems have been contemplated in which the exposure conditions are modified while test exposure is repeated, so as to determine the appropriate exposure conditions. However, such systems are impractical as recording materials and the like are wastefully consumed.

SUMMARY OF THE INVENTION

In view of the aforementioned, an object of the present invention is to provide an image forming device and image forming method in which appropriate exposure conditions can be easily determined even for a film original.

A first aspect of the present invention is an image forming device comprising: first scanning/exposing means for scanning light, which exits from a first light source, onto a first original of a predetermined size, and for imaging, at an exposure position, light which has one of been reflected at and been transmitted through the first original, thereby exposing an image of the first original onto a photosensitive material; second scanning/exposing means for scanning light, which exits from a second light source, onto a second original of a predetermined size which is smaller than the predetermined size of the first original, and for imaging, at the exposure position, light which has been transmitted through the second original and enlarging optical means, thereby enlarging and exposing an image of the second original onto a photosensitive material; reading means, on which the light transmitted through the second original is incident, for reading densities of the image of the second original per pixel; and control means, when the image of the second original is to be exposed onto the photosensitive material, for causing the light which exits from the second light source to be scanned one or more times onto the second original, and causing the reading means to read the image of the second original, and determining exposure conditions on the basis of the densities of the respective pixels of the image of the second original which densities were read by the reading means, and causing the second scanning/exposing means to expose the image of the second original onto the photosensitive material in accordance with determined exposure conditions.

In a second aspect of the present invention, the first aspect further comprises reflecting means for reading, for reflecting the light which has been transmitted through the second original in a direction different than the optical path of the light, when the reading means is reading densities, wherein the reading means is disposed at a light reflecting side of the reflecting means for reading, and imaging means is provided between the reflecting means for reading and the reading means, the imaging means imaging, at a position at which the reading means is disposed, light reflected by the reflecting means for reading.

In a third aspect of the present invention, the first aspect further comprises reflecting means for reading, for reflecting the light which has been transmitted through the second original in a direction different than the optical path of the light, when the reading means is reading densities, wherein the reading means is disposed at a position which is at a light reflecting side of the reflecting means for reading and which is conjugated with an imaging position for exposure light for exposure by the second scanning/exposing means.

The image forming method of the present invention comprises a step of scanning, onto a first original of a predetermined size, light exiting from a first light source, and imaging, at an exposure position, light which is one of reflected at or transmitted through the first original, and exposing an image of the first original onto a photosensitive material, the method comprising the following steps which are executed before, after or simultaneously with the above-described step:

scanning one or more times light, which exits from a second light source, onto a second original of a size which is smaller than the predetermined size of the first original, and reading densities of an image of the second original per pixel;

determining exposure conditions on the basis of read densities of respective pixels of the image of the second original; and scanning light, and imaging at the exposure position light transmitted through the second original, and enlarging and exposing the image of the second original onto a photosensitive material on the basis of the exposure conditions, wherein all of the steps are executed by a single system.

The image forming device relating to the present invention includes a first scanning/exposing means which scans light exiting from the first light source onto a first original of a predetermined size, images at an exposure position the light which is reflected at or is transmitted through the first original, and exposes an image of the first original onto a photosensitive material; and a second scanning/exposing means which scans light exiting from the second light source onto a second original of a size which is smaller than the predetermined size, images light transmitted through the second original at the exposure position, and enlarges and exposes an image of the second original onto a photosensitive material. A paper document, for example, may be used as the first original, and a film original may be used as the second original.

Further, the present invention includes a reading means, onto which light transmitted through the second original is incident, and which reads densities of the image of the second original per pixel. When the image of the second original is to be scanned and exposed onto the photosensitive material, the control means causes the light exiting from the second light source to be scanned onto the second original one or more times, causes the reading means to read the image of the second original, determines exposure conditions on the basis of the densities of the respective pixels of the image of the second original which densities were read by the reading means, and causes the second scanning/exposing means to expose the image of the second original onto the photosensitive material in accordance with the determined exposure conditions.

In order for the reading means to read the image per pixel, in the second aspect of the present invention, the image forming device may be further provided with a reflecting means for reading which reflects the light transmitted through the second original in a direction different than the optical path of the light. The reading means is disposed at the light reflecting side of the reflecting means for reading. An imaging means for imaging, at the position at which the reading means is disposed, the light reflected by the reflecting means for reading is provided between the reflecting means for reading and the reading means. In accordance with this structure, there is no need to place the reading means at a position which is conjugated with the position for imaging the light transmitted through the second original. Therefore, there are more degrees of freedom of the position at which the reading means is disposed, and the image forming device can be made compact.

The third aspect of the present invention is further provided with a reflecting means for reading which reflects the light transmitted through the second original in a direction different than the optical path of the light. The reading means may be disposed at a position which is at the light reflecting side of the reflecting means for reading and which is conjugated with an imaging position for exposure light for exposure effected by the second scanning/exposing means. With such a structure, there is no need to provide an imaging means such as that in the second aspect. Therefore, the structure of the image forming device can be simplified and the cost can be reduced.

The appropriate exposure conditions can be determined by calculation on the basis of the read densities of the respective pixels of the image of the second original, by providing a reading means for reading the densities of the image of the second original per pixel, as in, for example, the exposure condition determining method disclosed in JP-A-61-137145. Further, there is no need for complex operations such as modifying the exposure conditions while repeating test exposure so as to determine the appropriate exposure conditions. Accordingly, even in a case in which a film original is used as the second original, appropriate exposure conditions can be easily obtained for the film original.

It is preferable that the reading means reads the image by dividing the image into pixels and into three colors, e.g., R, G, B. In order to separate the density of the pixel into three colors and read the respective densities, the reading means may read the density of each pixel for a single color by a single scan and repeat the reading three times, or may read the densities of the respective colors of each pixel by a single scan.

Any photosensitive material may be applied to the image recording device of the present invention as long as a visible image can be obtained by predetermined developing processing of a latent image obtained by imagewise exposure. Examples include conventional color photographic photosensitive materials (e.g., negative film, reversal film, color photographic printing paper), color diffusion transfer photosensitive material, color heat development photosensitive material, color photosensitive pressure-sensitive material, and the like. Further, in a case in which a positive image is recorded onto a photosensitive material by using an original of a positive image, a so-called positive-positive type photosensitive material can be used as the photosensitive material. In a case in which a positive image is recorded onto a photosensitive material by using an original of a negative image, a so-called negative-positive type photosensitive material can be used.

DESCRIPTION OF THE PREFERRED EMBODIMENTS

Figure 1:
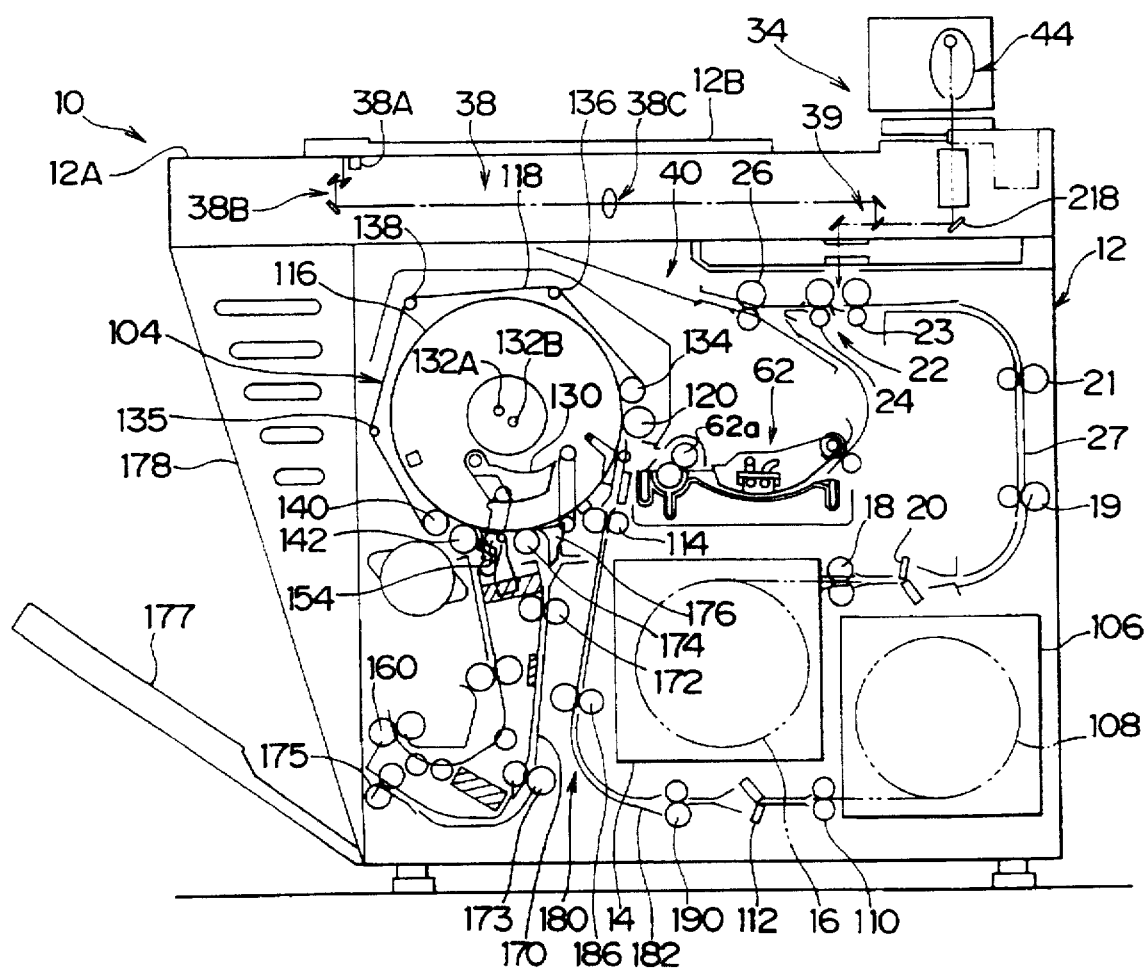
FIG. 1 is a schematic structural view of an image recording device relating to the present embodiment.

Hereinafter, embodiments of the present invention will be described in detail with reference to the drawings. FIG. 1 illustrates an image recording device 10 which serves as an image forming device relating to the present invention. A machine stand 12 of the image recording device 10 is formed in a box-shape on the whole. A loading stand 12A on which an original is loaded is provided at the top surface of the machine stand 12. A presser cover 12B is attached to the loading stand 12A, and can be opened and closed with the axis of opening and closing being a region at the rear side of the device. Further, a transparent glass plate 12C (see FIG. 2) is mounted to the loading stand 12A. A paper document 13 (see FIG. 2) or the like serving as a first original is placed on the transparent glass plate 12C. The paper original 13 loaded on the transparent glass plate 12C is maintained at a predetermined position by the closing of the presser cover 12B.

A photosensitive material magazine 14, in which a photosensitive material 16 wound in roll form is accommodated, is disposed within the machine stand 12 of the image recording device 10. The photosensitive material magazine 14 is set such that the photosensitive surface (exposure surface) of the photosensitive material 16 pulled out from the photosensitive material magazine 14 is oriented toward the bottom of the device. Nip rollers 18 and a cutter 20 are disposed in a vicinity of the opening of the photosensitive material magazine 14 from which the photosensitive material 16 is pulled out. After a predetermined length of the photosensitive material 16 has been withdrawn from the photosensitive material magazine 14, the photosensitive material 16 is cut by the cutter 20. A plurality of conveying rollers 19, 21, 23, 24, 26 are disposed in that order next to the cutter 20. Guide plates 27 are disposed between the respective conveying rollers. The photosensitive material 16 which has been cut to the predetermined length is conveyed by the conveying rollers 19, 21, 23, 24, 26 and the guide plates 27 to an exposure section 22 which is provided between the conveying rollers 23, 24.

Figure 2:
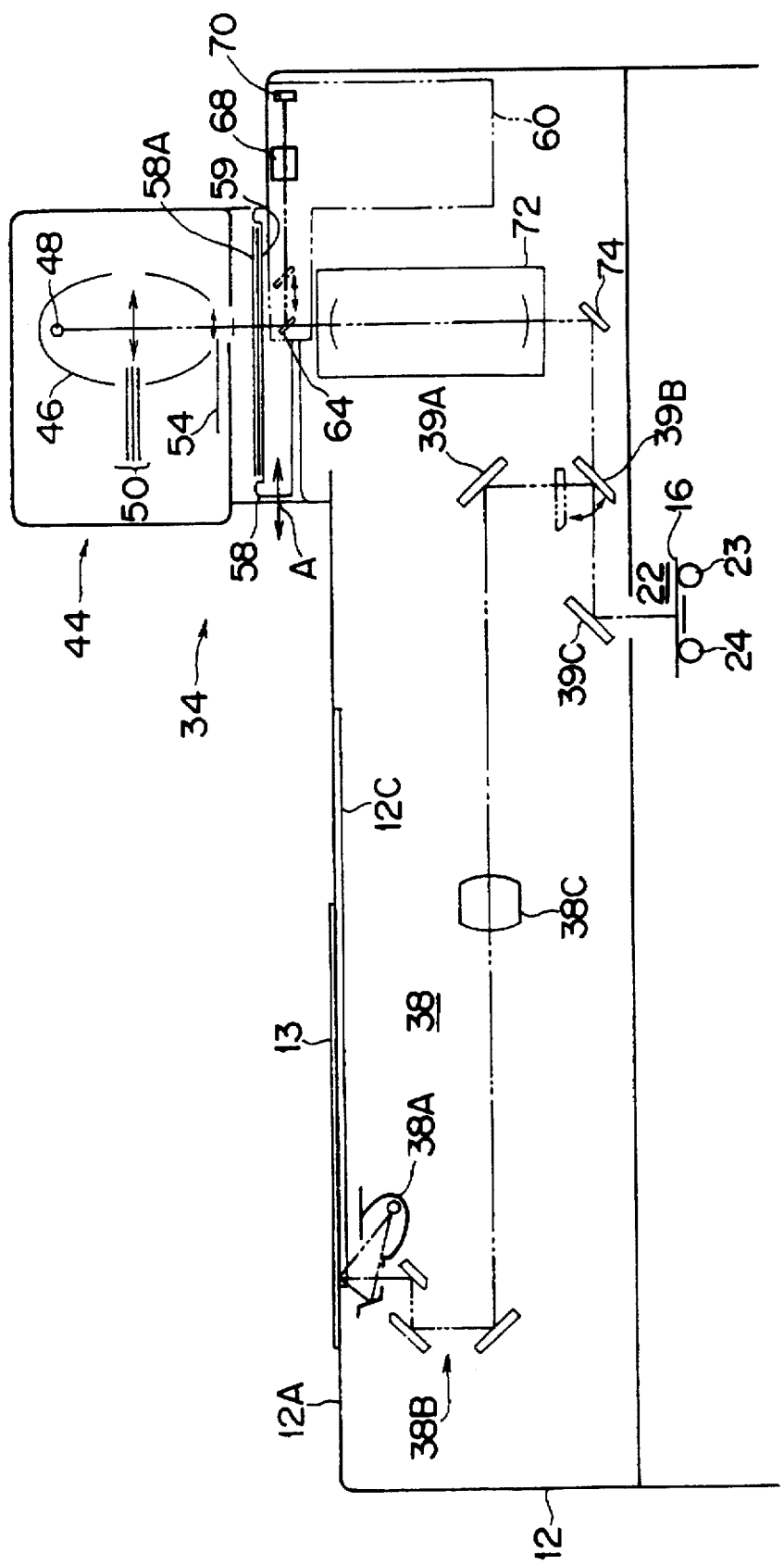
FIG. 2 is a schematic structural view of an optical system of the image recording device.
Figure 3:
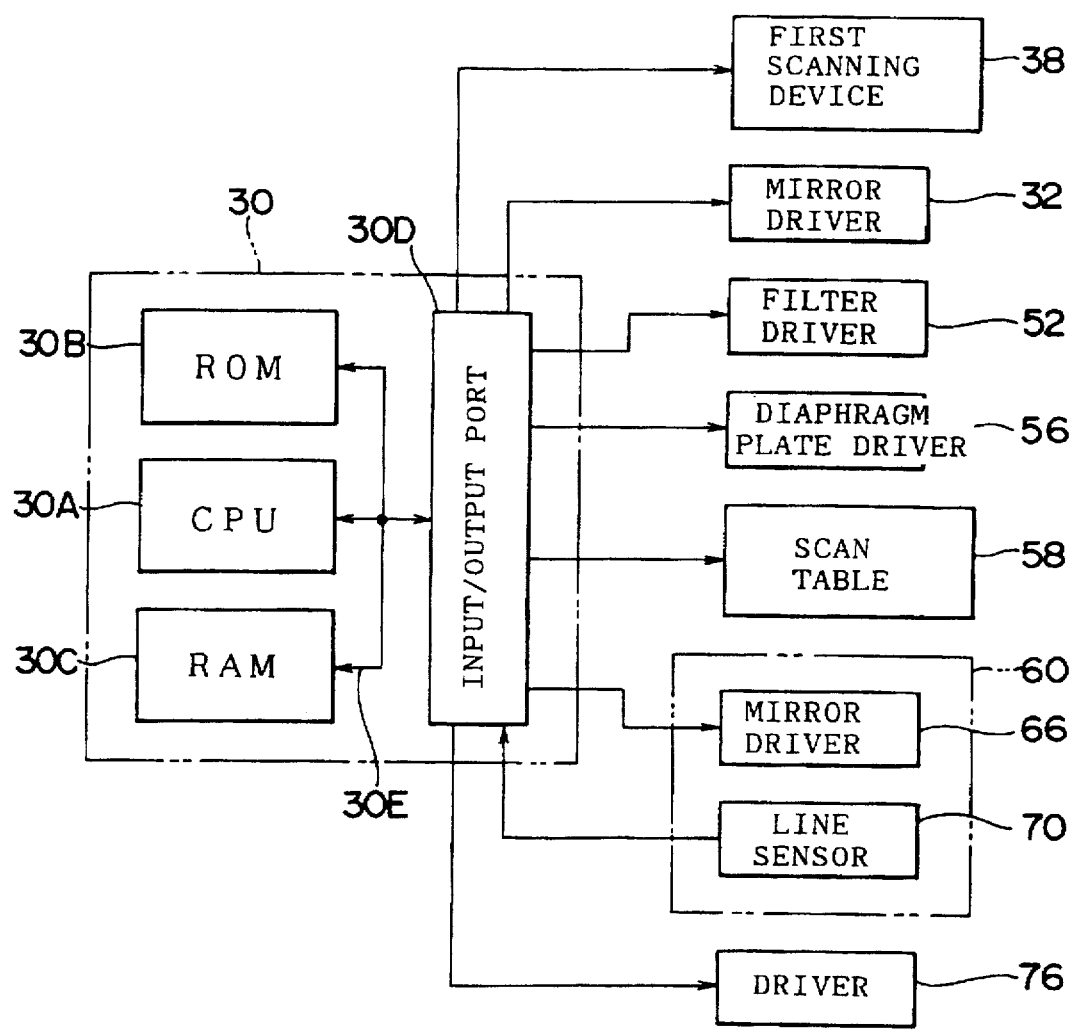
FIG. 3 is a schematic block diagram illustrating the structure of peripheral devices of a control device.

A first scanning device 38 serving as a first scanning/exposing means is provided above the exposure section 22 in a space below the transparent glass plate 12C. As can be seen in FIG. 2, the first scanning device 38 includes a halogen lamp 38A, a mirror unit 38B, a lens unit 38C, a mirror unit 39, and a filter and diaphragm (both unillustrated). The halogen lamp 38A, which serves as a first light source, and the mirror unit 38B move along the transparent glass plate 12C under the transparent glass plate 12C. The mirror unit 39 guides light exiting from the lens unit 38C to the exposure section 22. As illustrated in FIG. 3, a driving section or the like (shown by "first scanning device 38" in FIG. 3) which drives the halogen lamp 38A and the mirror unit 38B of the first scanning device 38 is connected to an input/output port 30D of a control device 30, and is operated in accordance with designations from the control device 30.

As illustrated in FIG. 2, in the present embodiment, the mirror unit 39 is formed by mirrors 39A, 39B, 39C. Light exiting substantially horizontally from the lens unit 38C is reflected substantially perpendicularly (downward) by the mirror 39A, is reflected substantially perpendicularly (in a horizontal direction) by the reflection of the mirror 39B, and is reflected substantially perpendicularly (downward) by the mirror 39C, such that the light is guided to the exposure section 22. The mirror 39B is moved by a mirror driver 32 (see FIG. 3) to the position illustrated by the solid line in FIG. 2 or the position illustrated by the imaginary line in FIG. 2. The mirror driver 32 is connected to the input/output port 30D of the control device 30 (see FIG. 3), and moves the mirror 39B in accordance with designations from the control device 30.

A second scanning device 34, which corresponds to the second scanning/exposing means of the present invention, is provided next to the first scanning device 38. The second scanning device 34 is provided with a light source unit 44 which is disposed above the machine stand 12. A reflector 46 and a lamp 48 which serves as a second light source are provided within a casing 44A of the light source unit 44. Further, a light-adjusting filter portion 50 having C (cyan), M (magenta) and Y (yellow) filters is disposed at the light exiting side of the lamp 48. The respective filters of the light-adjusting filter portion 50 are moved by a filter driver 52 (see FIG. 3) so as to advance onto and withdraw from the optical axis of the lamp 48. The filter driver 52 is connected to the input/output port 30D of the control device 30, and moves the respective filters in accordance with designations from the control device 30 such that the filters advance onto and withdraw from the optical axis.

A diaphragm plate 54 is disposed below the light-adjusting filter portion 50. The diaphragm plate 54 is moved by a diaphragm plate driver 56 (see FIG. 3) so as to advance onto and withdraw from the optical axis. The diaphragm plate driver 56 is connected to the input/output port 30D of the control device 30, and moves the diaphragm plate 54 in accordance with designations from the control device 30 such that the diaphragm plate 54 advances onto and withdraws from the optical axis. The diaphragm plate 54 is formed such that the amount of opening varies continuously along the longitudinal direction thereof. The amount of the light which is transmitted through and exits from the diaphragm plate 54 varies in accordance with the position of the diaphragm plate 54 with respect to the optical axis. An unillustrated slit is provided under the position at which the diaphragm plate 54 is disposed. Due to the slit, the light which is transmitted through the diaphragm plate 54 exits from the casing 44A as slit light.

A scan table 58 is provided under the light source unit 44. A film original 59, which serves as a second original and which may be a negative film, a reversal film or the like, is set at the scan table 58. The scan table 58 is provided with a holder 58A which holds the film original 59 set at the scan table 58. The scan table 58 1s connected to the input/output port 30D of the control device 30, and moves along the directions of arrow A in FIG. 2 in accordance with designations from the control device 30. As the scan table 58 moves, the region at which the slit light is illuminated onto the film original set on the scan table 58 moves. Further, a film photometry unit 60 is provided under the scan table 58.

The film photometry unit 60 is provided with a mirror 64 which serves as the reflecting means for reading of the present invention. The mirror 64 is moved by a mirror driver 66 (see FIG. 3) between a position on the optical path of the slit light which has been transmitted through the region at which the scan table 58 is disposed (the position illustrated by the solid line in FIG. 2, referred to as the "photometry position") and a position withdrawn from the optical path (the position illustrated by the broken line in FIG. 2, referred to as the "withdrawn position"). The mirror driver 66 is connected to the input/output port 30D of the control device 30, and moves the mirror 64 in accordance with designations from the control device 30.

A lens 68, which serves as the imaging means of the present invention, and a line sensor 70, which serves as the reading means of the present invention, are disposed in that order at the slit light exiting side of the mirror 64 which has been moved onto the optical path. The lens 68 is formed such that the slit light incident thereon is imaged onto the light-receiving surface of the line sensor 70. The line sensor 70 is provided with a plurality of light-receiving elements which are arranged in three rows. Each row of light-receiving elements is provided with a filter through which only light of wavelengths of R, G, B, respectively, is transmitted. The amounts of light of the respective component color lights R, G, B which are transmitted through a region corresponding to one pixel row of the image of the film original are measured by the respective light-receiving element rows. The line sensor 70 is connected to the input/output port 30D of the control device 30, and the results of measurement are outputted to the control device 30.

A zoom lens 72 is disposed under the mirror 64. A mirror 74, which reflects toward the mirror 39B light which has exited from the zoom lens 72, is disposed at the light exiting side of the zoom lens 72. In a case in which the mirror 39B has been moved to the position illustrated by the imaginary line in FIG. 2, the light reflected by the mirror 74 is incident on the mirror 39C and is reflected thereby to the exposure section 22. The magnification of the zoom lens 72 is changed by a driver 76 (see FIG. 3), and the incident slit light is imaged at the exposure position of the exposure section 22.

The image of the film original is enlarged and exposed onto the photosensitive material 16 by the zoom lens 72. The driver 76 is connected to the input/output port 30D of the control device 30, and changes the magnification of the zoom lens 72 in accordance with designations from the control device 30. The control device 30 is formed by a CPU 30A, a ROM 30B, a RAM 30C, and the input/output port 30D. These components are connected together via a bus 30E.

A switch back section 40 (FIG. 1) is provided next to the exposure section 22, and a water applying section 62 is provided below the exposure section 22. The photosensitive material 16, which was conveyed upwardly at the side of the photosensitive material magazine 14 and whose image was exposed at the exposure section 22, is delivered temporarily into the switch back section 40. Thereafter, the conveying rollers 26 are rotated reversely so that the photosensitive material 16 is delivered into the water applying section 62 via a conveying path provided under the exposure section 22. A plurality of pipes are connected to the water applying section 62, and water is supplied via these pipes. A heat developing transfer section 104 is disposed next to the water applying section 62. The photosensitive material 16, to which water has been applied, is sent into the heat developing transfer section 104.

A receiving material magazine 106, in which an image-receiving material 108 wound in roll form is accommodated, is disposed within the machine stand 12 next to the photosensitive material magazine 14. A dye fixing material having mordant is applied to the image forming surface of the image-receiving material 108. The receiving material magazine 106 is set such that the image forming surface of the image-receiving material 108 pulled out from the receiving material magazine 106 is oriented toward the top of the device. Nip rollers 110 and a cutter 112 are disposed in that order in a vicinity of the opening of the receiving material magazine 106 from which the image-receiving material 108 is withdrawn. After a predetermined length of the image-receiving material 108 has been pulled out from the receiving material magazine 106, the image-receiving material 108 is cut by the cutter 112. An image-receiving material conveying section 180, which is equipped with conveying rollers 186, 190, 114 and guide plates 182, is provided next to the cutter 112. The image-receiving material 108, which has been cut to the predetermined length, is conveyed to the heat developing transfer section 104 by the respective conveying rollers and the guide plates 182 of the image-receiving material conveying section 180.

The photosensitive material 16 conveyed to the heat developing transfer section 104 is delivered between a laminating roller 120 and a heat drum 116. Synchronously with the conveying of the photosensitive material 16, the image-receiving material 108 is conveyed between the laminating roller 120 and the heat drum 116 in a state in which the photosensitive material 16 precedes the image-receiving material 108 by a predetermined length, and the photosensitive material 16 and the image-receiving material 108 are superposed. A pair of halogen lamps 132A, 132B are disposed at the interior portion of the heat drum 116. The temperature of the surface of the heat drum 116 is raised by the halogen lamps 132A, 132B. Five training rollers 134, 135,136, 138, 140 are disposed at the outer peripheral side of the heat drum 116. An endless press-contact belt 118 is trained around the training rollers 134 through 140. The endless press-contact belt 118 between the training roller 134 and the training roller 140 press-contacts the outer periphery of the heat drum 116.

A bending/guiding roller 142 is disposed at the lower portion of the heat drum 116 at the downstream side in the material supplying direction of the endless belt 118. At the lower portion of the heating drum 116 at the downstream side of the bending/guiding roller 142 in the material supplying direction, a peeling claw 154 is axially supported by a shaft so as to be pivotable. The peeling claw 154 peels from the heat drum 116 only the photosensitive material 16, which is superposed with the image-receiving material 108 in a state in which the photosensitive material 16 precedes the image-receiving material 108 by a predetermined length. The photosensitive material 16 peeled by the peeling claw 154 is trained around the bending/guiding roller 142 and is discharged by discharge rollers 160 into a waste photosensitive material accommodating box 178 so as to be accumulated.

Further, a peeling roller 174 and a peeling claw 176 are disposed next to the bending/guiding roller 142 in a vicinity of the heat drum 116. The peeling roller 174 and the peeling claw 176 peel, from the outer peripheral surface of the heat drum 116, the image-receiving material 108 which was not peeled by the peeling claw 154. Receiving material discharge rollers 172, 173, 175 are disposed in that order under the peeling roller 174 and the peeling claw 176. Receiving material guides 170 are disposed between the respective discharge rollers. The image-receiving material 108 which has been peeled by the peeling roller 174 and the peeling claw 176 is guided and conveyed, and is discharged into a tray 177.

Hereinafter, scanning/exposing processing of an image of the paper original 13, which serves as the first original, onto the photosensitive material 16 will be described first as operation of the present embodiment. When the paper document 13 is loaded on the transparent glass plate 12C, the control device 30 moves the mirror 39B by the mirror driver 32 to the position illustrated by the solid line in FIG. 2, and the photosensitive material 16 is conveyed to the exposure section 22, as will be described later. Next, the halogen lamp 38A is lit, and the halogen lamp 38A and the mirror unit 38B are moved along the transparent glass plate 12C.

In this way, the light, which exits from the halogen lamp 38A and is reflected at the paper document 13, is reflected at the mirror unit 38B, is transmitted through the lens unit 38C, is reflected at the mirror units 39A, 39B, 39C (the reflecting means for exposure), and is illuminated onto the photosensitive material 16. The image on the paper document 13 is thereby scanned/exposed onto the photosensitive material 16.

Figure 4:
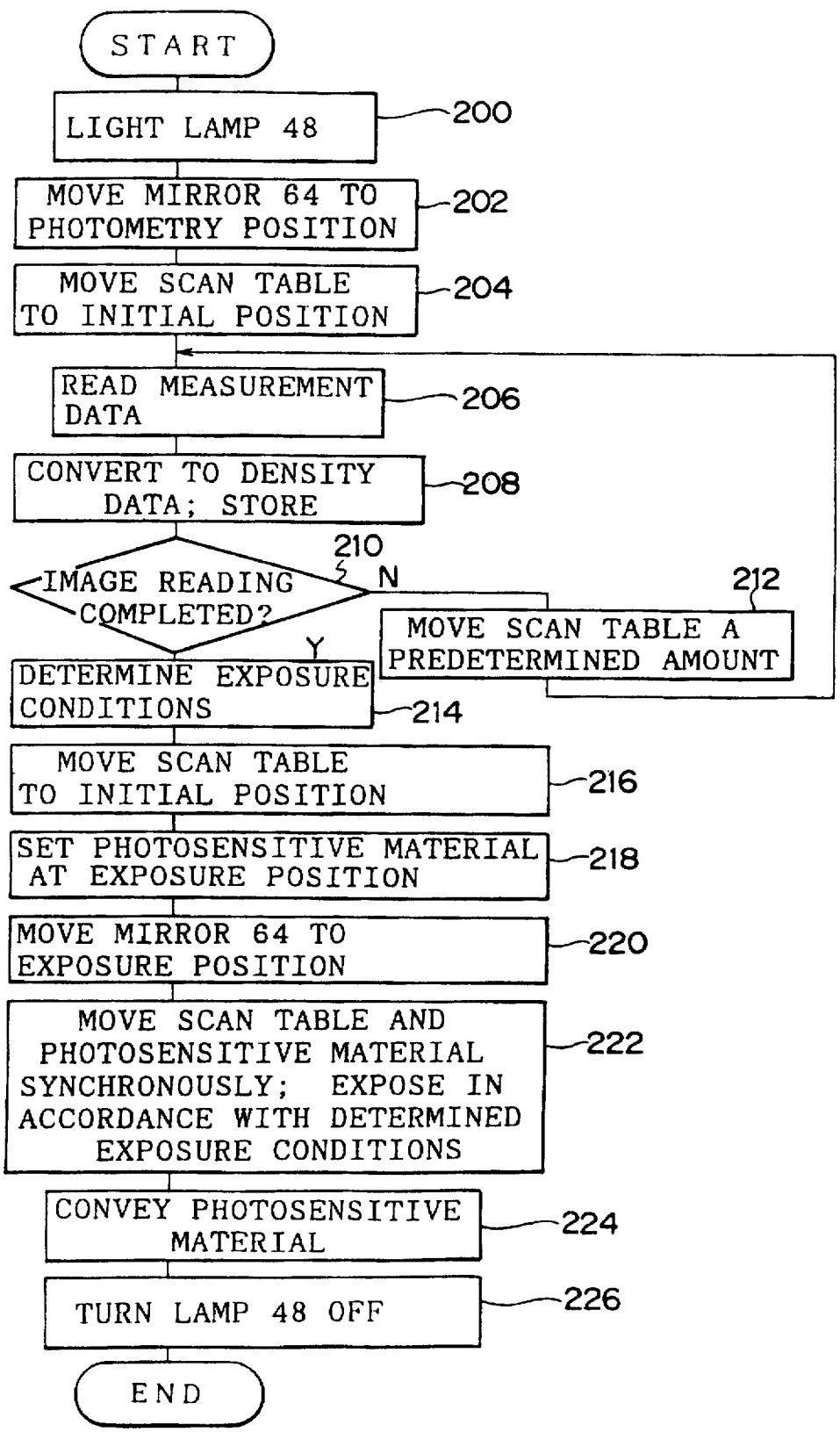
FIG. 4 is a flowchart explaining, as operation of the present embodiment, a processing for exposing an image of a film original.

Scanning/exposing processing of the image of the film original 59 onto the photosensitive material will be described with reference to the flowchart in FIG. 4. The processing in FIG. 4 is executed at the control device 30 when the film original is set at the scan table 58 and a designation to expose the image of the film original onto the photosensitive material 16 is inputted.

First, in steps 200 through 212, the image of the film original is read. Namely, in step 200, the lamp 48 is lit, and in step 202, the mirror 64 is moved to the photometry position by the mirror driver 66. In step 204, the scan table 58 is moved to the initial position. The initial position is a position at which slit light exiting from the light source unit 44 is illuminated onto an end portion of the image of the film original. In this way, the slit light transmitted through the end portion of the image of the film original is reflected by the mirror 64, is transmitted through the lens 68, and is imaged onto the light-receiving surface of the line sensor 70.

The light amounts of the respective component color lights R, G, B transmitted through the respective pixels forming one pixel row of the image of the film original are measured at the line sensor 70.

In step 206, fetching of the measured data, which is outputted from the line sensor 70, is effected. In step 208, the measurement data, which was fetched from the line sensor 70 and which represents the light amounts of the respective component color lights, is converted into density data representing a density of each component color of each pixel forming one pixel row, and the converted density data is stored in the RAM 30C. In step 210, a determination is made as to whether reading of the image has been completed. If the answer to the determination in step 210 is "No", in step 212, the scan table 58 is moved a predetermined amount corresponding to the pixel row width, and the process returns to step 206. Accordingly, steps 206 through 212 are repeated until the answer to the determination in step 210 is "Yes". By moving the scan table 58 (and the film original) gradually along the directions of arrow A in FIG. 2, the amounts of light transmitted through the image of the film original are measured by the line sensor 70 for each pixel and for each of R, G, B. The measured data is successively converted into density data and stored.

When the answer to the determination in step 210 is "Yes", in step 214, the exposure conditions are determined on the basis of the density data for each color and each pixel of the film original, which density data is stored in the RAM 30C. Any of various methods may be used to determined the exposure conditions. For example, the following method disclosed in JP-A-61-137145 may be used. Feature information of the image of the film original is extracted on the basis of the density data, and the density and the color correction amount for the exposure conditions are calculated. The image which has been corrected by the correction amount is displayed on a display means such as a monitor or the like. The correction amount is modified such that the density and the color of a predetermined position on the displayed image, which position is designated by a designating means, become predetermined values. The exposure conditions can then be determined on the basis of the modified correction amount. In this way, the appropriate exposure conditions can be obtained easily without conducting test exposure or the like.

When the exposure conditions have been determined in a manner such as that described above, in subsequent step 216 and steps thereafter, exposure of the image of the film original onto the photosensitive material 16 is carried out. Namely, in step 216, the scan table 58 is again moved to the initial position. In step 218, the nip rollers 18 are operated, and the photosensitive material 16 is pulled out from the magazine 14. When a predetermined length of the photosensitive material 16 has been pulled out, the cutter 20 is operated so that the photosensitive material 16 is cut to the predetermined length. The cut photosensitive material 16 is conveyed to the exposure position of the exposure section 22. In step 220, the mirror 64 is moved by the mirror driver 66 to the withdrawn position. Further, the mirror 39B is moved by the mirror driver 32 to the position illustrated by the imaginary line in FIG. 2. In this way, the slit light transmitted through the film original is guided to the exposure section 22.

In subsequent step 222, the respective filters of the light-adjusting filter portion 50 and the diaphragm plate 54 are moved in accordance with the determined exposure conditions, and the scan table 58 and the photosensitive material 16 are moved synchronously. The image of the film original is thereby exposed onto the photosensitive material successively per pixel row at the determined exposure conditions. When exposure of the image has been completed, in step 224, the photosensitive material 16 is conveyed from the exposure section 22 and is sent into the switch back section 40. In step 226, the lamp 48 is turned off, and processing is completed.

The transfer/formation of the image exposed onto the photosensitive material 16 by the above-described processes is carried out as follows. Namely, the photosensitive material 16 which has temporarily been sent into the switch back section 40 is delivered into the water applying section 62 due to the reverse rotation of the conveying rollers 26. Water is applied to the photosensitive material 16 as a solvent for image forming. Excess water is removed by squeeze rollers 62a, and the photosensitive material 16 is sent into the heat developing transfer section 104. Further, the image-receiving material 108 is pulled out from the receiving material magazine 106 by the nip rollers 110 synchronously with the above-described exposure onto the photosensitive material 16. When a predetermined length of the image-receiving material 108 has been pulled out, the cutter 112 is operated so that the image-receiving material 108 is cut to the predetermined length. The cut image-receiving material 108 is conveyed by the conveying rollers 190, 186, 114 while being guided by the guide plates 182, and is held in a standby state immediately before the heat developing transfer section 104.

At the heat developing transfer section 104, when the delivery of the photosensitive material 16 between the outer periphery of the heat drum 116 and the laminating roller 120 by the squeeze rollers 62a is detected, the conveying of the image-receiving material 108 is restarted so that the image receiving material 108 is delivered to the laminating roller 120, and also, the heat drum 116 is activated. A guide plate (not illustrated) is disposed between the laminating roller 120 and the squeeze rollers 62a of the water applying section 62. The photosensitive material 16 delivered from the squeeze rollers 62a is reliably guided to the laminating roller 120 by the guide plate.

The photosensitive material 16 and the image-receiving material 108, which are superposed by the laminating roller 120, are nipped in a superposed state between the heat drum 116 and the endless pressure/contact belt 118, and are conveyed over approximately ⅔ of the periphery of the heat drum 116 (between the training roller 134 and the training roller 140). The photosensitive material 16 and the image receiving material 108 are thereby heated. Mobile dyes are released, and at the same time, the dyes are transferred to the dye fixing layer of the image-receiving material 108 so that an image is obtained.

When the photosensitive material 16 and the image-receiving material 108 reach the lower portion of the heat drum 116, the peeling claw 154 is moved by a cam 130. The peeling claw 154 engages the leading end portion of the photosensitive material 16 which is conveyed so as to precede the image-receiving material 108 by a predetermined length, and the leading end portion of the photosensitive material 16 is peeled from the outer periphery of the heat drum 116. Due to the return movement of the peeling claw 154, a pinch roller 157 presses the photosensitive material 16. The photosensitive material 16 is thereby trained around the bending/guiding roller 142 while being pressed by the pinch roller 157, and is moved downward and accumulated in a waste photosensitive material accommodating box 178.

The image-receiving material 108, which has been separated from the photosensitive material 16 and which moves while still fit closely to the heat drum 116, is sent to the peeling roller 174 and is peeled. The image receiving material 108, which is peeled from the outer periphery of the heat drum 116 by the peeling claw 176, is moved downwardly while trained around the peeling roller 174. The image-receiving material 108 is conveyed by the receiving material discharge rollers 172, 173, 175 while being guided by the receiving material guides 170, and is discharged into the tray 177.

Next, a variation of the placement of the line sensor 70, which serves as the reading means relating to the present invention, will be described. In the example illustrated in FIG. 5, the mirror 39C disposed above the exposure section 22 can be moved by an unillustrated driver to a position at which the mirror 39C is withdrawn from the optical path of substantially horizontal light which has been transmitted through the position at which the mirror 39B is disposed (i.e., the mirror 39C can be moved to the position illustrated by the imaginary line in FIG. 5). The line sensor 70 is disposed at a side of the position at which the mirror 39C is disposed, which side is opposite the side at which the mirror 39B is located. In a state in which the mirror 39C is moved to the withdrawn position, the substantially horizontal light which is transmitted through the position at which the mirror 39B is disposed is incident on the line sensor 70. In this case, the mirror 39C corresponds to the reflecting means for exposure of the present invention.

More specifically, the position of the line sensor 70 is such that the distance from the line sensor 70 to the position of the reflective surface of the mirror 39C when the mirror 39C is disposed on the optical path is equal to the distance from that reflective surface to the photosensitive surface of the photosensitive material 16. In other words, the line sensor 70 is disposed at a position which is conjugated with an imaging position of the slit light which has been transmitted through the film original. Accordingly, if the mirror 39C is moved to the withdrawn position, because the light which has been transmitted through the film original is imaged at the light-receiving surface of the line sensor 70, there is no need to provide the lens 68, as opposed to the example illustrated in FIG. 2. The structure can therefore be made even more simple.

Next, another variation of the placement of the line sensor 70 will be described. In the example illustrated in FIG. 6, a mirror 80 serving as the reflecting means for reading of the present invention is provided at the light exiting side of the zoom lens 72. The mirror 80 is movable between a position (reflecting position) on the optical path of the light which has exited from the zoom lens 72, which position is illustrated by the solid line in FIG. 6, and a position (withdrawn position) at which the mirror 80 is withdrawn from the optical path. In a state in which the mirror 80 has been moved to the reflecting position, a mirror 82 is disposed at the light exiting side of the mirror 80, and the line sensor 70 is disposed at the light exiting side of the mirror 82. The mirror 82 also serves as the reflecting means for reading.

The mirrors 80, 82 and the line sensor 70 are disposed such that, when the mirror 80 is positioned at the reflecting position, length of the optical path to the light receiving surface of the line sensor 70 of the light reflected at the reflecting surface of the mirror 80 is equal to the length of the optical path from the position corresponding to the reflecting surface to the photosensitive surface of the photosensitive material 16. Accordingly, the position of the line sensor 70 is a position which is conjugated with an imaging position of the slit light which has been transmitted through the image of the film original. If the mirror 80 is moved to the reflecting position, the light which has been transmitted through the film original is imaged onto the light receiving surface of the line sensor 70. In this way, as compared with the example illustrated in FIG. 2, there is no need to provide the lens 68, and the structure can be made even more simple.

Still another variation of the line sensor 70 will be described hereinafter. In the example illustrated in FIG. 7, the line sensor 70 is provided between the conveying rollers 23 and the conveying rollers 24 of the exposure section 22. The line sensor 70 is moved by an unillustrated driver between a measuring position illustrated by the solid line in FIG. 7 and a withdrawn position illustrated by the imaginary line in FIG. 7. At the measuring position, the heightwise position of the light receiving surface of the line sensor 70 is equal to the heightwise position of the photosensitive surface of the photosensitive material 16 which is conveyed to the exposure section 22 at the time of exposure.

If the line sensor 70 is moved to the measurement position in a state in which the photosensitive material 16 has not been conveyed to the exposure section 22, the slit light which has been transmitted through the image of the film original is imaged on the light-receiving surface of the line sensor 70. Accordingly, there is no need to provide the lens 68, which is illustrated in FIG. 2 and which serves as an imaging means, nor a reflecting means such as the mirror 82 illustrated in FIG. 6, and the structure can be made even more simple.

Figure 5:
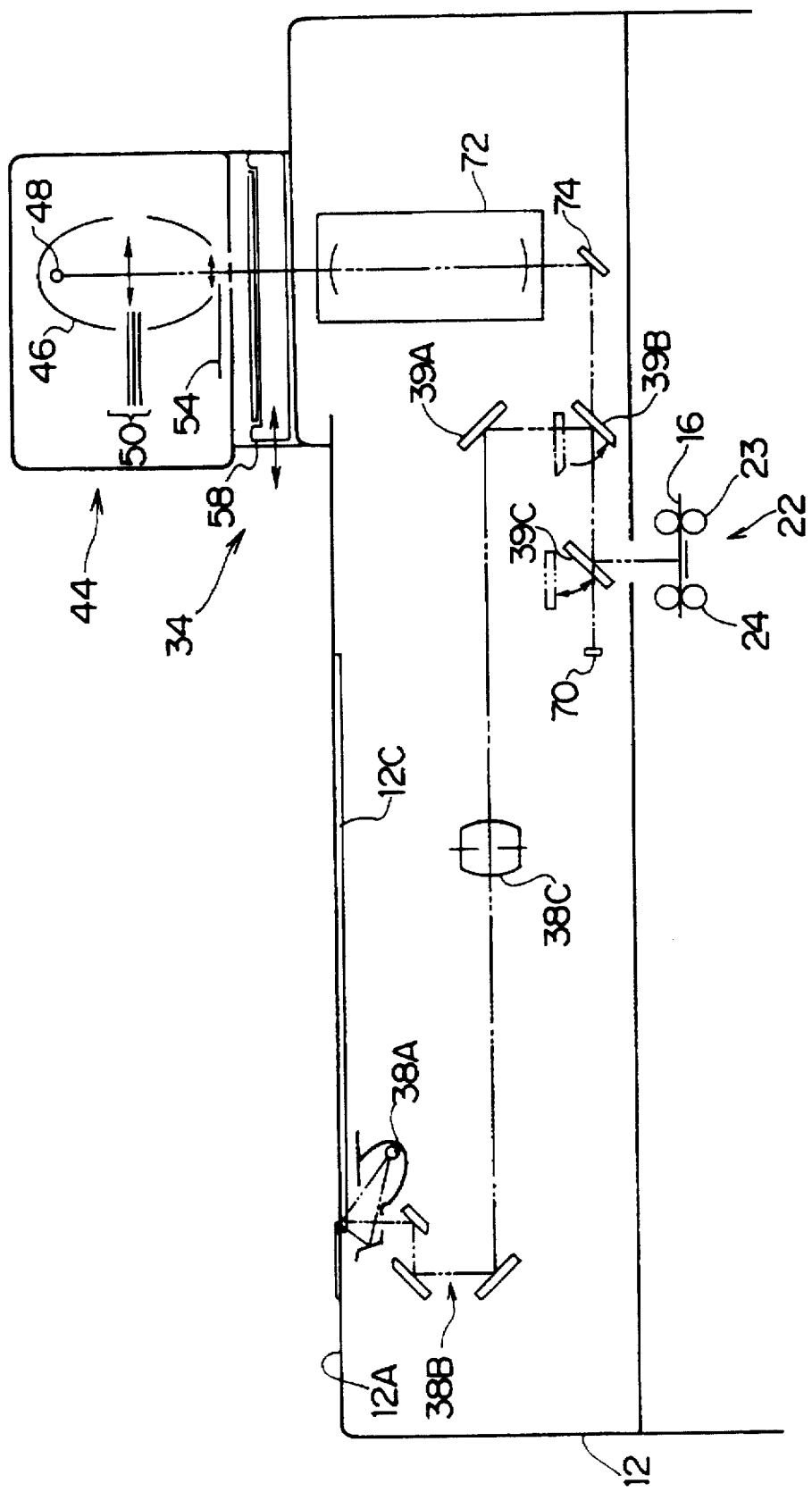
FIG. 5 is a schematic structural view of an optical system, illustrating another example of the placement of a line sensor.
Figure 7:
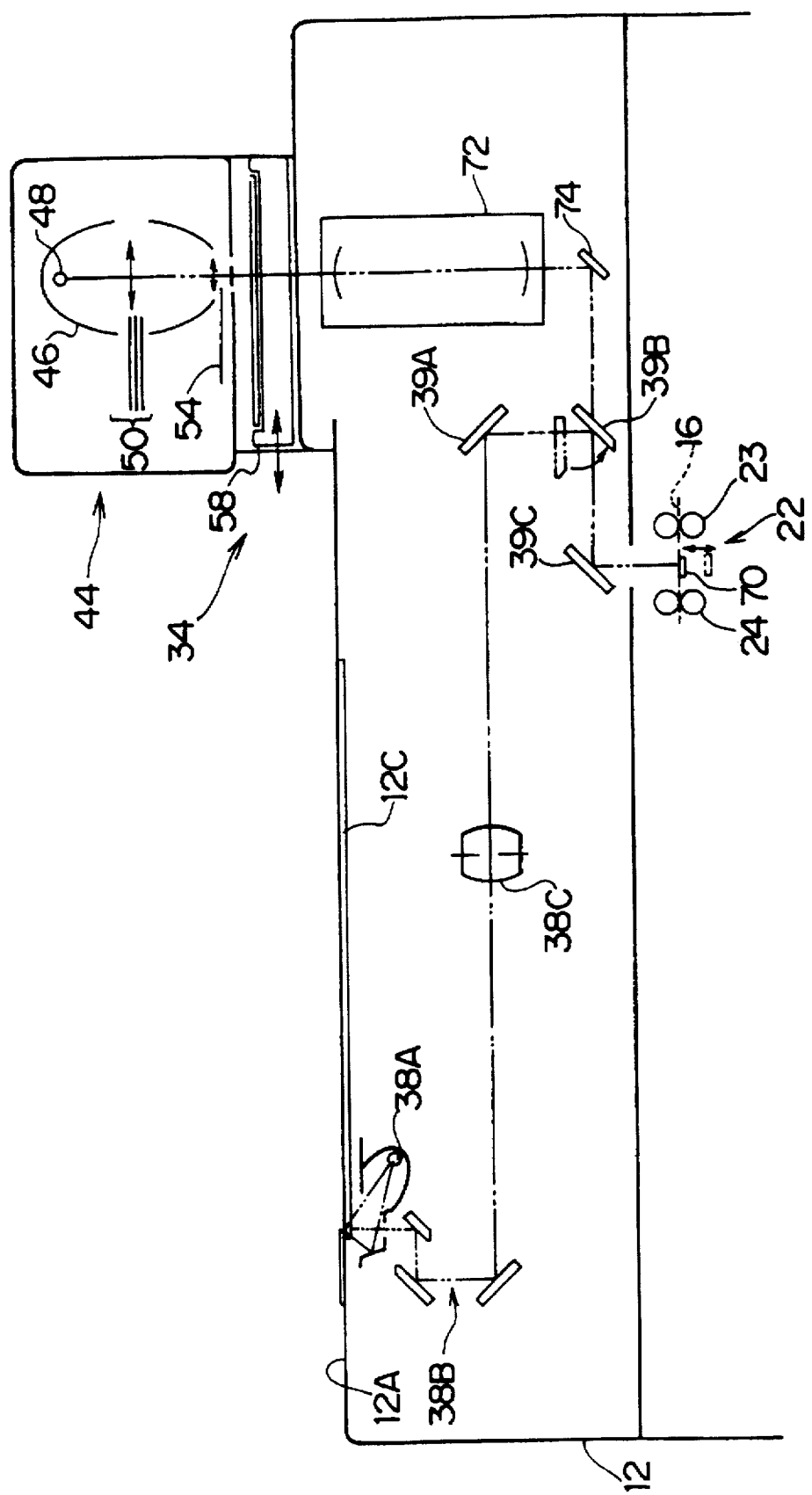
FIG. 7 is a schematic structural view of an optical system, illustrating yet another example of the placement of the line sensor.

In a case in which the line sensor 70 is disposed at the position illustrated in FIG. 5 or FIG. 7, the density of a reference white plate or a test chart or the average density of the paper original 13 serving as the first original can be measured as disclosed in JP-A-64-530, JP-A-1-217335, JP-A-1-277229 or the like.

The above explanation describes a case in which the color line sensor 70 having light-receiving elements which measure the amount of light of each of the component color lights of R, G and B is used as the reading means relating to the present invention. However, the present invention is not limited to the same, and a monochrome line sensor may be used as the reading means. In this case, while the light exiting from the second light source is scanned on the second original by the scan table 58 or the like, any one of the R, G, B filters is inserted on the optical path of the light reflected by the reflecting means. This process is repeated three times with a different filter being used each time. In this way, the density of each color is measured for each pixel by three scans. Alternatively, while the light exiting from the second light source is scanned on the second original by the scan table 58 or the like, the filter inserted on the optical path is replaced at high speed so that the densities of R, G, B per pixel row are successively measured. The densities for each color can thereby be measured per pixel by one scan. Further, in any of the above-described methods, instead of inserting the filters on and withdrawing the filters from the optical path, the color of the light illuminated to the film original may be switched to each component color light R, G, B. Moreover, the respective component color lights R, G, B may be separated by a spectral means such as a dichroic filter or a dichroic prism or the like, and each component color light may be measured by a different monochrome line sensor.

Figure 6:
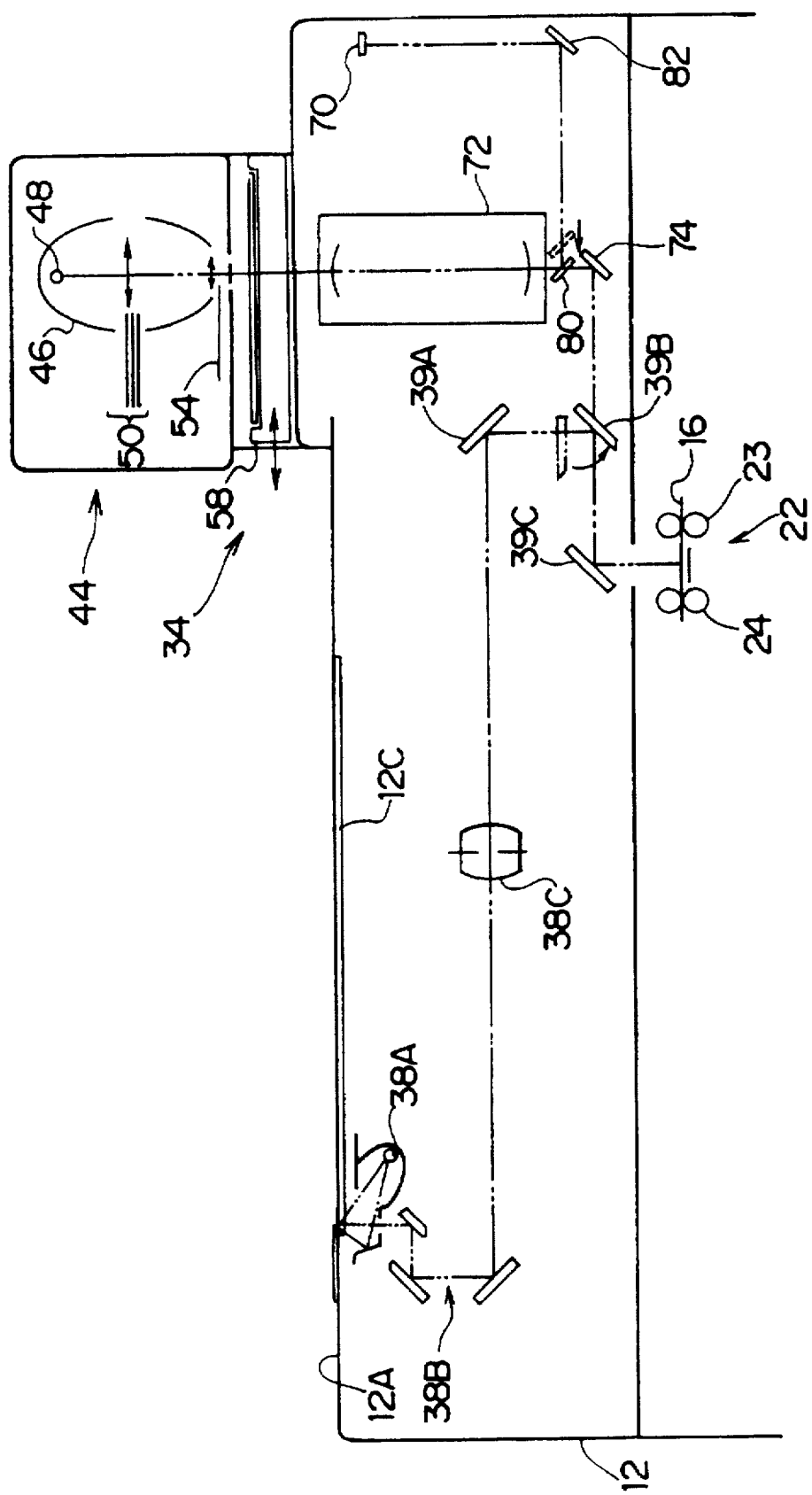
FIG. 6 is a schematic structural view of an optical system, illustrating still another example of the placement of a line sensor.

Although mirrors are used in the above description as the reflecting means, the present invention is not limited to the same, and half-mirrors may be used in place of, for example, the mirror 64 illustrated in FIG. 2 and the mirror 80 illustrated in FIG. 6. In this way, the amount of light of the exposure light decreases, but because drivers or the like for moving the mirrors become unnecessary, the structure of the image forming device can be simplified.

Further, the reading means of the present invention may be used as an original reading device, and the R, G, B density data per pixel which data is read by the reading means may be outputted to an external device.

In the present invention which has been described herein, a reading means is provided. Light which has been transmitted through the second original such as a film original or the like is incident on the reading means, and the reading means reads the density of the image of the second original per pixel. When the image of the second original is to be exposed onto a photosensitive material, the control means causes the light exiting from the second light source to be scanned one or more times onto the second original and causes the reading means to read the image of the second original. The exposure conditions are determined on the basis of the densities of the respective pixels of the image of the second original which densities are read by the reading means. The control means causes the second scanning/exposing means to expose the image of the second original onto a photosensitive material in accordance with the determined exposure conditions. Therefore, a superior effect can be achieved in that appropriate exposure conditions can be easily obtained even for a film original.

What is claimed is:

1. An image forming device comprising:

first scanning/exposing means for scanning light, which exits from a first light source, onto a first original of a predetermined size, and for imaging, at an exposure position, light which has one of been reflected at and been transmitted through said first original, thereby exposing an image of said first original onto a photosensitive material;

second scanning/exposing means for scanning light, which exits from a second light source, onto a second original of a predetermined size which is smaller than the predetermined size of said first original, and for imaging, at said exposure position, light which has been transmitted through said second original and enlarging optical means, thereby enlarging and exposing an image of said second original onto a photosensitive material;

reading means, on which the light transmitted through said second original is incident, for reading densities of the image of said second original per pixel; and control means, when the image of said second original is to be exposed onto the photosensitive material, for causing the light which exits from said second light source to be scanned one or more times onto said second original, and causing said reading means to read the image of said second original, and determining exposure conditions on the basis of the densities of the respective pixels of the image of said second original which densities were read by said reading means, and causing said second scanning/exposing means to expose the image of said second original onto the photosensitive material in accordance with determined exposure conditions.

2. An image forming device according to claim 1 further comprising:

reflecting means for reading, for reflecting the light which has been transmitted through said second original in a direction different than the optical path of said light, when said reading means is reading densities, wherein said reading means is disposed at a light reflecting side of said reflecting means for reading, and imaging means is provided between said reflecting means for reading and said reading means, said imaging means imaging, at a position at which said reading means is disposed, light reflected by said reflecting means for reading.

3. An image forming device according to claim 2, wherein when the image of said second original is to be exposed by said second scanning/exposing means, said reflecting means for reading moves to a position at which said reflecting means for reading does not reflect the light transmitted through said second original.

4. An image forming device according to claim 3, wherein said first scanning/exposing means and said second scanning/exposing means have a common reflecting means for exposure which is used both for exposure by said first scanning/exposing means and for exposure by said second scanning/exposing means.

5. An image forming means according to claim 2, wherein said reading means is movable to the exposure position, and said reflecting means for reading is also used during exposure effected by said second scanning/exposing means.

6. An image forming means according to claim 5, wherein said second scanning/exposing means has a reflecting means for exposure which is also used during reading.

7. An image forming means according to claim 6, wherein said reflecting means for exposure is also used during exposure effected by said first scanning/exposing means.

8. An image forming device according to claim 1 further comprising:
reflecting means for reading, for reflecting the light which has been transmitted through said second original in a direction different than the optical path of said light, when said reading means is reading densities,
wherein said reading means is disposed at a position which is at a light reflecting side of said reflecting means for reading and which is conjugated with an imaging position for exposure light for exposure by said second scanning/exposing means.

9. An image forming device according to claim 8, wherein said second scanning/exposing means has a reflecting means for exposure which is used to effect exposure.

10. An image forming means according to claim 9, wherein when reading is to be effected, said reflecting means for exposure moves to a position at which said reflecting means for exposure does not reflect the light transmitted through said second original, and when said second scanning/exposing means is to effect exposure, said reflecting means for exposure moves to a position at which said reflecting means for exposure reflects onto the photosensitive material the light transmitted through said second original.

11. An image forming means according to claim 9, wherein said reflecting means for exposure also functions as a portion of said first scanning/exposing means.

12. An image forming means according to claim 8, wherein when said second scanning/exposing means is to effect exposure, said reflecting means for reading moves to a position at which said reflecting means for reading does not reflect the light transmitted through said second original.

13. An image forming means according to claim 12, wherein said first scanning/exposing means and said second scanning/exposing means have a common reflecting means for exposure which is used both for exposure by said first scanning/exposing means and for exposure by said second scanning/exposing means.

14. An image forming means according to claim 1, wherein said reading means reads pixel densities of color lights of a plurality of colors at one time.

15. An image forming device according to claim 1, wherein said reading means reads pixel densities of a single color light at one time.

16. An image forming device according to claim 15 further comprising:
optical filters corresponding to said reading means.

17. An image forming device according to claim 16, wherein each of said optical filters is fixed and held on an optical path of light from said second light source for one scan respectively so that reading is completed by scanning a plurality of times.

18. An image forming device according to claim 16, wherein during one scan, each of said optical filters is inserted onto and withdrawn from an optical path of light from said second light source so that reading is completed by scanning a single time.

19. The image forming device according to claim 1, wherein said reading means is disposed to receive light which has one of been reflected at and been transmitted through said first original, said reading means reading densities of the image of said first original per pixel.

20. An image forming device comprising:
a first scanner for scanning light, which exits from a first light source, onto a first original;
a first optical system for imaging, at an exposure position, light which has one of been reflected at and been transmitted through said first original, thereby exposing an image of said first original onto a photosensitive material;
a second scanner for scanning light, which exits from a second light source, onto a second original;
a second optical system for imaging, at said exposure position, light which has been transmitted through said second original and a zoom lens, thereby enlarging and exposing an image of said second original onto a photosensitive material;
a sensor, on which the light transmitted through said second original is incident, for reading densities of the image of said second original per pixel; and
a controller, when the image of said second original is to be exposed onto the photosensitive material, for causing the light which exits from said second light source to be scanned one or more times onto said second original, and causing said sensor to read the image of said second original, and determining exposure conditions on the basis of the densities of the respective pixels of the image of said second original which densities were read by said sensor, and causing exposure of the image of said second original onto the photosensitive material in accordance with determined exposure conditions, using said second scanner and said second optical system.

21. An image forming method comprising a step of
scanning, onto a first original of a predetermined size, light exiting from a first light source, and
imaging, at an exposure position, light which is one of reflected at or transmitted through said first original, and
exposing an image of said first original onto a photosensitive material,
said method comprising the following steps which are executed before, after or simultaneously with the above-described step:

scanning one or more times light, which exits from a second light source, onto a second original of a size which is smaller than the predetermined size of said first original, and reading densities of an image of said second original per pixel;

determining exposure conditions on the basis of read densities of respective pixels of the image of said second original; and scanning light, and imaging at said exposure position light transmitted through said second original, and enlarging and exposing the image of said second original onto a photosensitive material on the basis of said exposure conditions, wherein all of said steps are executed by a single system.

* * * * *